United States Patent [19]
Gatto et al.

[11] Patent Number: 6,034,784
[45] Date of Patent: Mar. 7, 2000

[54] ANTI-SKEW AUTO-START SYSTEM FOR DOCUMENT SCANNERS

[75] Inventors: Jean-Marie Gatto, London, United Kingdom; Thierry Brunet De Courssou, Palo Alto, Calif.

[73] Assignee: Cyberscan Technology, Inc., Palo Alto, Calif.

[21] Appl. No.: 08/904,337

[22] Filed: Jul. 31, 1997

[51] Int. Cl.[7] ..................................................... H04N 1/04
[52] U.S. Cl. .......................................... 358/1.18; 358/488
[58] Field of Search ...................................... 358/1.18, 1.5, 358/1.1, 1.9, 488, 494, 496, 498, 474; 382/315, 317, 321; 355/48, 50, 408; 271/228, 258.01; 399/395

[56] References Cited

U.S. PATENT DOCUMENTS

| | | | |
|---|---|---|---|
| 4,462,676 | 7/1984 | Shimura | 355/3 BE |
| 4,568,074 | 2/1986 | Murayoshi | 271/121 |
| 4,621,801 | 11/1986 | Sanchez | 271/251 |
| 4,849,788 | 7/1989 | Prebola | 355/317 |
| 4,881,729 | 11/1989 | Culligan et al. | 271/3.1 |
| 4,970,661 | 11/1990 | Tsuzuki et al. | 364/519 |
| 5,043,771 | 8/1991 | Shibata | 355/317 |
| 5,240,241 | 8/1993 | Kawazoe | 271/114 |
| 5,648,808 | 7/1997 | Yanagi et al. | 347/104 |

*Primary Examiner*—Madeleine Nguyen
*Attorney, Agent, or Firm*—Young Law Firm, P.C.

[57] ABSTRACT

A system that ensures that documents are perfectly aligned before scanner paper feed is enabled. Subsequently, the paper drive is activated and the resulting scanned image does not have any annoying skew. This system is particularly effective with fast start scanners having a scanning speed over 200 mm per second. Sheet-fed scanners can take advantage of this Anti-Skew Auto-start system at a marginal cost. The method and the special tools to calibrate the Anti-Skew Auto-start system ensure repeatable performance.

8 Claims, 9 Drawing Sheets

ANTI-SKEW AUTO-START SYSTEM FOR DOCUMENT SCANNERS

BACKGROUND OF THE INVENTION

1. Field of the Invention

The invention pertains to the field of sheet-fed document scanners. In particular, the present invention relates to an anti-skew auto-start system for high-speed scanners.

2. Description of the Related Art

Existing sheet-fed document scanners have the tendency to skew documents and the resulting image either must be de-skewed by post processing or the document may have to be re-scanned. De-skewing by post processing, however, degrades image quality. Furthermore, when skew is significant, the paper hits a side of the scanner, hence crushing or tearing it. The skew problem is significantly aggravated with fast scanners having a scanning speed of over 200 mm per second. Any misalignment in the introduction of the paper will be amplified when the feed roller seizes the paper.

Skew problems reduce quality and productivity significantly. Only sophisticated, fast and expensive sheet-fed scanners are equipped with belt or roller mechanisms that ensure paper skew is reduced or eliminated. Consumer type or personal type sheet-fed scanners, however, do not have any mechanism to eliminate paper feed skew.

SUMMARY OF THE INVENTION

It is, therefore, an object of the present invention to provide consumer type and personal scanners with an inexpensive, accurate and reliable mechanism to eliminate paper feed skew.

It is another object of the present invention to provide an auto-start feature which causes a scanner feed roller to seize a document from the input side of the scanner and pull it across the transparent glass protecting the linear image sensor as soon as an acceptably aligned document edge is presented to the input side of the scanner.

The anti-skew auto-start system according to the present invention can be easily adapted to most sheet-fed document scanners at a marginal cost. Most all sheet-fed scanners are built such that the linear optical sensor senses the reflected light from the document on a line that is the point of contact between the main feed roller and the transparent glass that protects the sensor.

The anti-skew auto-start system according to the present invention is based on offsetting the linear sensor optical line or focus-line by a very small amount towards the introduction side, a method of precisely adjusting this offset, the design of calibration tools and an algorithm to be used by the image processing circuit or the host computer to determine when the edge of the document is perfectly aligned.

The image sensor detects the change of contrast between the main feed roller and the edge of the paper that is slightly pinched between the roller and the protection glass before the roller is rotated. The offset distance depends on the main drive roller diameter and must be adjusted to within a few hundredths of a millimeter. This offset does not create any significant loss of resolution, as the change of image focus is negligible. Auxiliary proximity sensors are added to ensure paper width detection and smooth auto-start capability.

In accordance with the above objects and those that will be mentioned and will become apparent below, in one exemplary embodiment of the present invention, the auto-start and anti-skew system for a sheet-fed scanner comprises:

a. means for detecting an approximate width and approximate centering of a document placed at an input side of the sheet-fed scanner;

b. means for activating an illumination of the light source and activating an acquisition of information from the linear image sensor as soon as a document is placed in the input side of the sheet-fed scanner, to provide continuous upcoming pixel information;

c. means for classifying the continuous upcoming pixel information as roller pixels and non-roller pixels based on a contrast between a reflectance of the feed roller and a reflectance of the document, an acceptably aligned document edge engaged between a non-rotating feed roller and the transparent glass being identified by a predetermined number of non-roller pixels;

d. means for maintaining a precise parallel offset distance between a focus-line of the linear image sensor and an input line of contact where the feed roller contacts the transparent glass; and e. means for controlling a rotation of the feed roller, the controlling means activating a rotation of the feed roller to seize the document from the input side of the feed roller and pull the document, without inducing unacceptable skew, over the transparent glass as soon as the approximate width and centering of the document are detected and the predetermined number of non-roller pixels are acquired.

An advantage of this embodiment is that the feed roller rotation is activated as soon as the information derived from the document width, from the document centering and from the non-roller pixels indicates that the document edge is acceptably aligned, thereby enabling the feed roller to seize the document edge and feed the document over the linear image sensor without inducing an unacceptable skew.

According to another exemplary embodiment, the system according to the present invention further comprises processing means to determine, from the continuous upcoming pixel information, that an unacceptable skew has been induced soon after the document edge is seized when the rotation of the feed roller is activated, the processing means causing the feed roller rotation control means to reverse a rotation direction of the feed roller to free the document, to stop the rotation of the feed roller, and to return the sheet-fed scanner to a state of readiness to activate the feed roller as soon as an acceptably aligned document is identified.

An advantage of this embodiment is that this system provides an easy to use and automatic start feature while ensuring that an unacceptably skewed document is not pulled across the transparent glass protecting the linear image sensor.

According to a still further embodiment of the present invention, the detecting means comprises a plurality of proximity paper sensors. The plurality of proximity paper sensors may be infrared paper sensors, or any other suitable proximity sensors.

According to a still further embodiment of the present invention, a device for providing precise offset and alignment information between a focus-line of a scanner linear image sensor and an input line of contact where the scanner feed roller drags against the transparent glass protecting the linear image sensor, comprises:

a rigid foil, the rigid foil providing a uniform reflectance that is identifiable on a continuous upcoming pixel information stream generated by the linear image sensor, the rigid foil having a regular pattern of aligned chevrons placed on one side thereof, a reflectance of the chevrons being clearly distinguishable within the continuous upcoming pixel information, the regular pattern of aligned chevrons including a plurality of aligned peaks coinciding with an edge of the foil to form a calibration edge to be applied against the input line of a non-rotating feed roller, the regular pattern of aligned chevrons facing the image sensor to allow the peaks to be identified on the continuous upcoming pixel information stream and to provide peak pixels where the focus line intersects with the plurality of peaks.

Advantageously, geometrical information may be derived from counting a number of the peak pixels for each of the plurality of peaks, this geometrical information allowing precise offset and alignment information to be derived therefrom between the focus-line of the linear image sensor and the input line of contact where the feed roller drags against the transparent glass protecting the linear image sensor.

According to another embodiment, the device further comprises:

an elongated bar, the bar being held in place between the feed roller and the transparent glass by frictional forces when the feed roller is rotated, the bar being fixed on the foil adjacent to the calibration edge and on an opposite side of foil. The bar holds the calibration edge in place when the feed roller is rotated to provide a precise and repeatable means for obtaining the offset and alignment information.

The present invention also includes a method of ensuring that an edge of a document to be inserted into a sheet-fed scanner is perfectly aligned, the scanner including a light source, a feed roller, a linear image sensor and transparent glass disposed over the linear image sensor, the method comprising the steps of offsetting a focus-line of the linear image sensor relative to an input line of contact where the feed roller drags against the transparent glass;

determining an approximate width and centering of the document placed at an input side of the scanner;

activating an illumination of the light source and activating an acquisition of information from the linear image sensor to provide continuous upcoming pixel information;

classifying the continuous upcoming pixel information as roller pixels and non-roller pixels based on a contrast between a reflectance of the feed roller and a reflectance of the document, an acceptably aligned document edge engaged between a non-rotating feed roller and the transparent glass being identified by a predetermined number of non-roller pixels; and controlling a rotation of the feed roller, to activate a rotation of the feed roller and seize the document from the input side of the feed roller and pull the document, without inducing unacceptable skew, over the transparent glass as soon as the approximate width and centering of the document are detected and the predetermined number of non-roller pixels are acquired.

Such a method may also include the steps of:

determining, from the continuous upcoming pixel information, whether an unacceptable skew has been induced on the document soon after the document edge is seized when the rotation of the feed roller is activated, and, if an unacceptable skew has been induced, causing the feed roller to reverse a rotation direction to free the document;

stopping the rotation of the feed roller; and returning the sheet-fed scanner to a state of readiness to activate the feed roller as soon as an acceptably aligned document is identified.

BRIEF DESCRIPTION OF THE DRAWINGS

For a further understanding of the objects and advantages of the present invention, reference should be had to the following detailed description, taken in conjunction with the accompanying figures, in which like parts are given like reference numerals and wherein.

DETAILED DESCRIPTION OF THE INVENTION

The document scanners that can best take advantage of the anti-skew auto-start system according to the present invention are monochrome and color sheet-fed scanners. Duplex sheet-fed scanners work as well.

Figure 1:
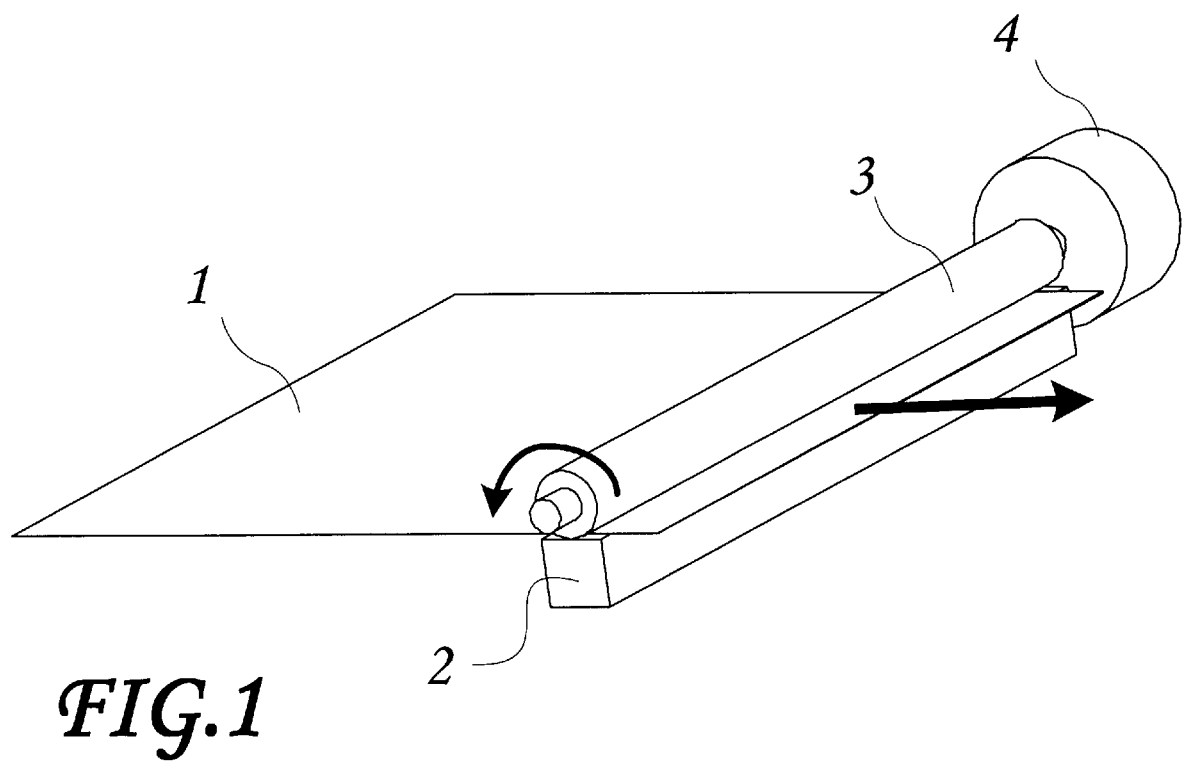
FIG. 1 is a perspective view of the major mechanical elements of a sheet-fed scanner. The electronics circuits that control the scanner and the communication link with the host computer are not represented.

FIG. 1 shows a typical arrangement and operating principle of a sheet-fed document scanner. In such a scanner, a document 1 is displaced by a rotating roller paper feeding mechanism 3 driven by a motor 4 over a fixed linear sensor 2 that senses reflected light from the document. Alternatively, the paper feeding mechanism can be a belt, a plurality of rollers or a plurality of rollers and belts. Illumination is provided from the linear sensor side. The linear sensor with its associated electronics records a fine of information at a time. When the motor and roller drive the document, the linear sensor with its associated electronics records the entire document area swept. Scanner control electronics and link with the host computer are not shown on FIG. 1.

Figure 2:
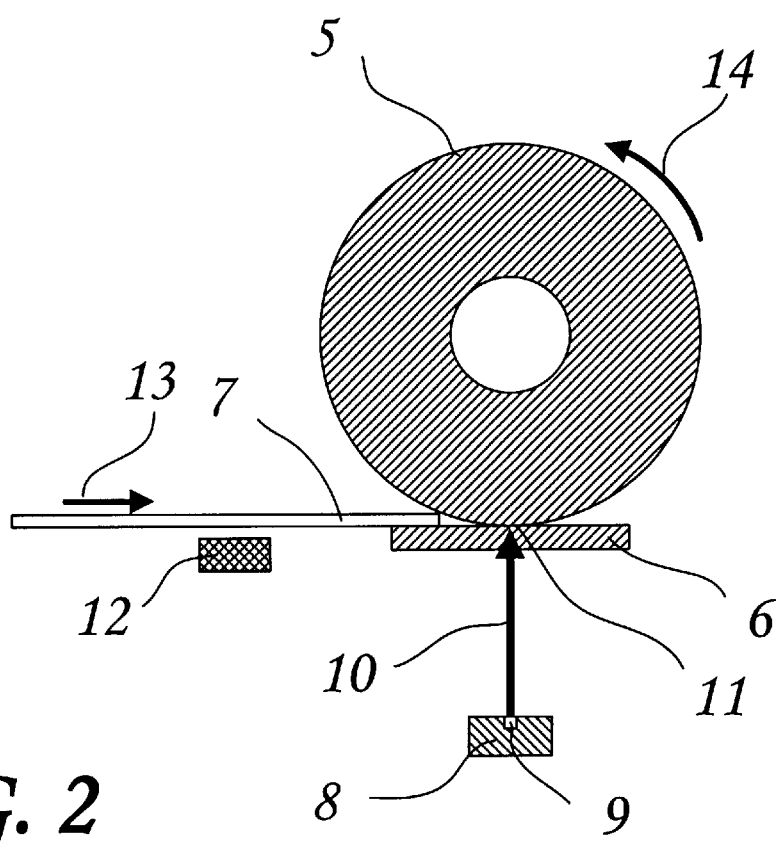
FIG. 2 is a cross section of the major mechanical and optical elements of a typical sheet-fed scanner.

In a typical sheet-fed scanner such as shown in FIG. 2, a black drive roller 5 presses gently against a transparent glass 6 that protects the image sensor 8. The roller and the glass have a common line of contact 11. A document 7 is presented into the scanner in the direction 13 shown. A paper sensor 12, usually a mechanical finger, detects the presence of the paper in the scanner input and activates a flag. The flag is transmitted by the scanner control electronics to the host computer where the application software takes the decision to order the paper feed, usually after a preset timeout. Paper feed is achieved by activating a motor that rotates the roller in the direction 14 shown. The roller 5 seizes and pulls the document 7 over the image sensor 8 in the direction 13. The image sensor control electronics is synchronized with the displacement of the paper in order to record an image, made of a series of pixels arranged in a matrix, of the complete document.

FIG. 2 shows a sheet-fed scanner, in cross-section. In the construction shown in FIG. 2, the optical path 10 from the line of photo-sensors 9 of the image sensor 8 is mechanically adjusted such that it coincides with the line formed by the point of contact 11 between the roller 5 and the surface of the glass 6. The focussing apparatus constructed with rod lenses when using CIS (Contact Image Sensors) or mirrors and conventional lenses when using CCD (Charge Coupled Devices) type image sensors are not represented.

Figure 3:
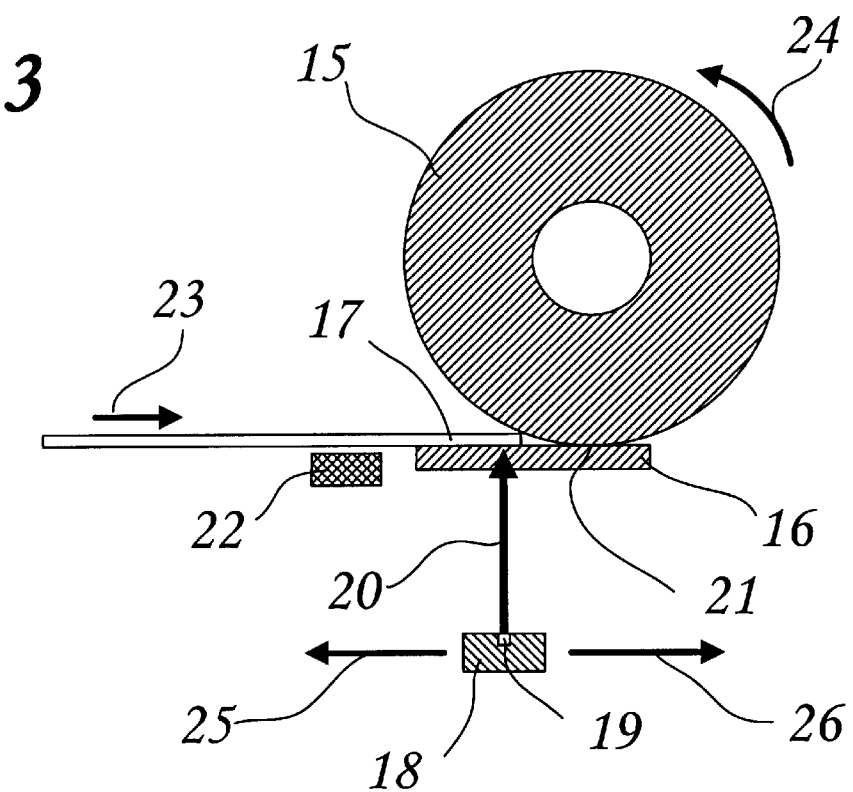
FIG. 3 is a cross-section of the major mechanical and optical elements of a sheet-fed scanner that make use of the anti-skew auto-start system according to the present invention.

In the sheet-fed scanner fitted with the anti-skew autostart system according to the present invention, as shown in FIG. 3 illustrating the offset principle, a black drive roller 15 presses gently against a transparent glass 16 that protects the contact image sensor 18 or the mirrors and lenses focusing apparatus. The roller and the glass have a common point of contact 21. A document 17 is presented into the scanner in the direction 23 shown. Paper feed is achieved by activating a motor that rotates the roller 15 in the direction 24 shown. The roller 15 seizes and pulls the document 17 over the image sensor 18 in the direction 23. The image sensor control electronics (not shown) are synchronized with the displacement of the paper in order to record an image, made of a series of pixels arranged in a matrix, of the complete document.

As shown in FIG. 3, the optical path 20 from the line of photo-sensors 19 of the image sensor 18 is mechanically or optically adjusted to fall in front of the line formed by the point of contact 21 between the roller 15 and the surface of the glass 16. The distance between the projection of optical sensor line 20 onto the upper surface of the glass and the line formed by the point of contact 21 between the roller 15 and the surface of the glass 16 is on the order of one millimeter.

In a first step, a plurality of proximity paper sensors 22, such as infra-red paper sensors, detect the approach of a document that is being presented in the scanner input and sends a notification to the scanner control electronics. The proximity sensors 22 are arranged in such a number and in such a way that they can determine approximately the width of frequently used paper sizes and their offset from the side of the scanner input.

Figure 4:
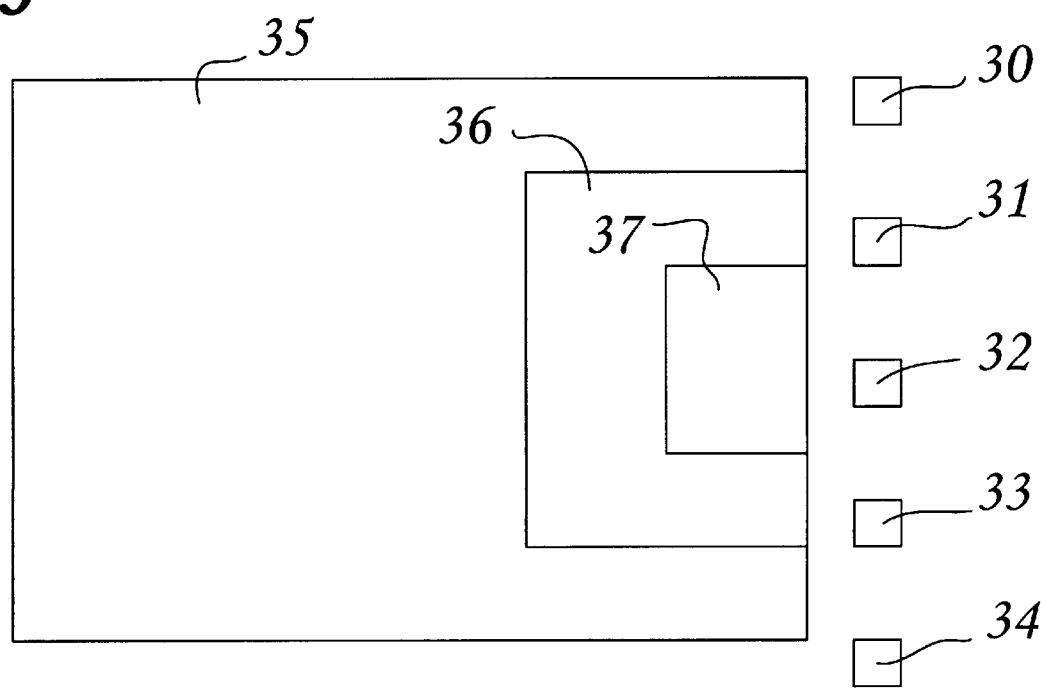
FIG. 4 is a top view showing a possible positioning arrangement of proximity sensors in order to detect various paper document sizes such as letter size, photo print size and business card size that are centered in the scanner input.

FIG. 4 is a top view showing a possible positioning arrangement for a plurality of proximity sensors 30, 31, 32, 33, 34 to detect various centered paper documents of different sizes, such as letter size 35, photo print size 36 and business card size 37, that are centered in the scanner input. A simple vote algorithm of the sensors that are activated enables determination of paper size and position.

Figure 5:
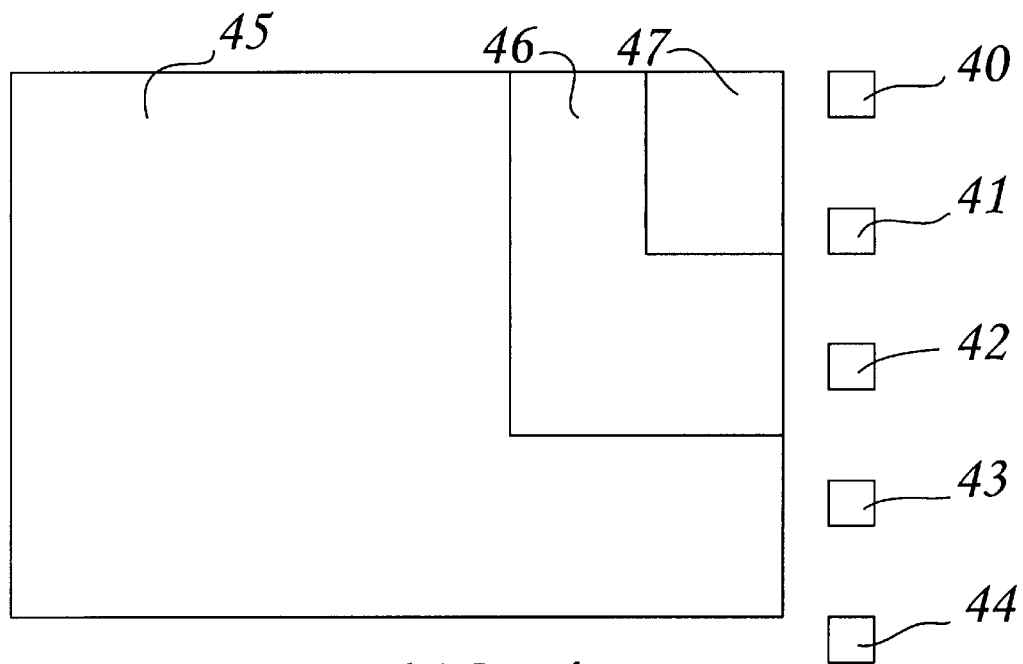
FIG. 5 is a top view showing a possible positioning arrangement of proximity sensors in order to detect various paper documents sizes such as letter size, photo print size and business card size that are aligned on one side of the scanner input.

FIG. 5 is a top view showing a possible positioning arrangement of a plurality of proximity sensors 40, 41, 42, 43, 44 to detect various paper documents aligned to one side, of various sizes, such as letter size 45, photo print size 46 and business card size 47, that are aligned on one side of the scanner input. A simple vote algorithm of the sensors that are activated enables determination of paper size and position.

As soon as the proximity sensors are activated as a document is presented in the scanner input, the image sensor light source is activated if it was not already switched-on.

In a second step, the image sensor control electronics or the associated host computer monitors the upcoming stream of pixels from the image sensor as the document arrives at a fill stop between the roller and the image sensor protective glass. The sensor line is mechanically or optically offset by a very small amount, to allow the edge of the document to be seen on the upcoming pixel stream only when the edge of the document becomes gently and uniformly engaged between the roller 15 and the glass protecting the image sensor 16. Normally, with standard documents such as photocopy paper, laser print paper, photo print paper or business card paper that are presented in the scanner input, the document will arrive at a full stop and will not slide between the roller and the glass.

Knowing approximately, from the proximity sensors, the width of the document that is presented in the scanner input and its offset from the side, the image sensor control electronics or the associated host computer determines if the paper edge is properly aligned, by matching the number of white pixels of reflected light corresponding to the white paper border with the theoretical number of pixels that should be seen. Pixels corresponding to the black roller are black. When the minimum required number of edge pixels that are representative of an acceptably aligned document are accounted for, the feeding of the paper is activated. As soon as the motor starts rotating, the paper is seized by the roller without inducing unacceptable skew.

In a third step, as soon as the motor has started to rotate the feed roller, the image sensor control electronics or the associated host computer monitors the first few lines of the document edge to verify if the paper is still properly aligned. If an unacceptable skew is detected, the image sensor control electronics or the associated host computer orders the immediate reversal of the rotation of the roller to free the document. This operation occurs very rapidly while the operator or the automatic feeder is still presenting the paper into the scanner, giving another chance for the paper edge to properly align itself.

Figure 16:
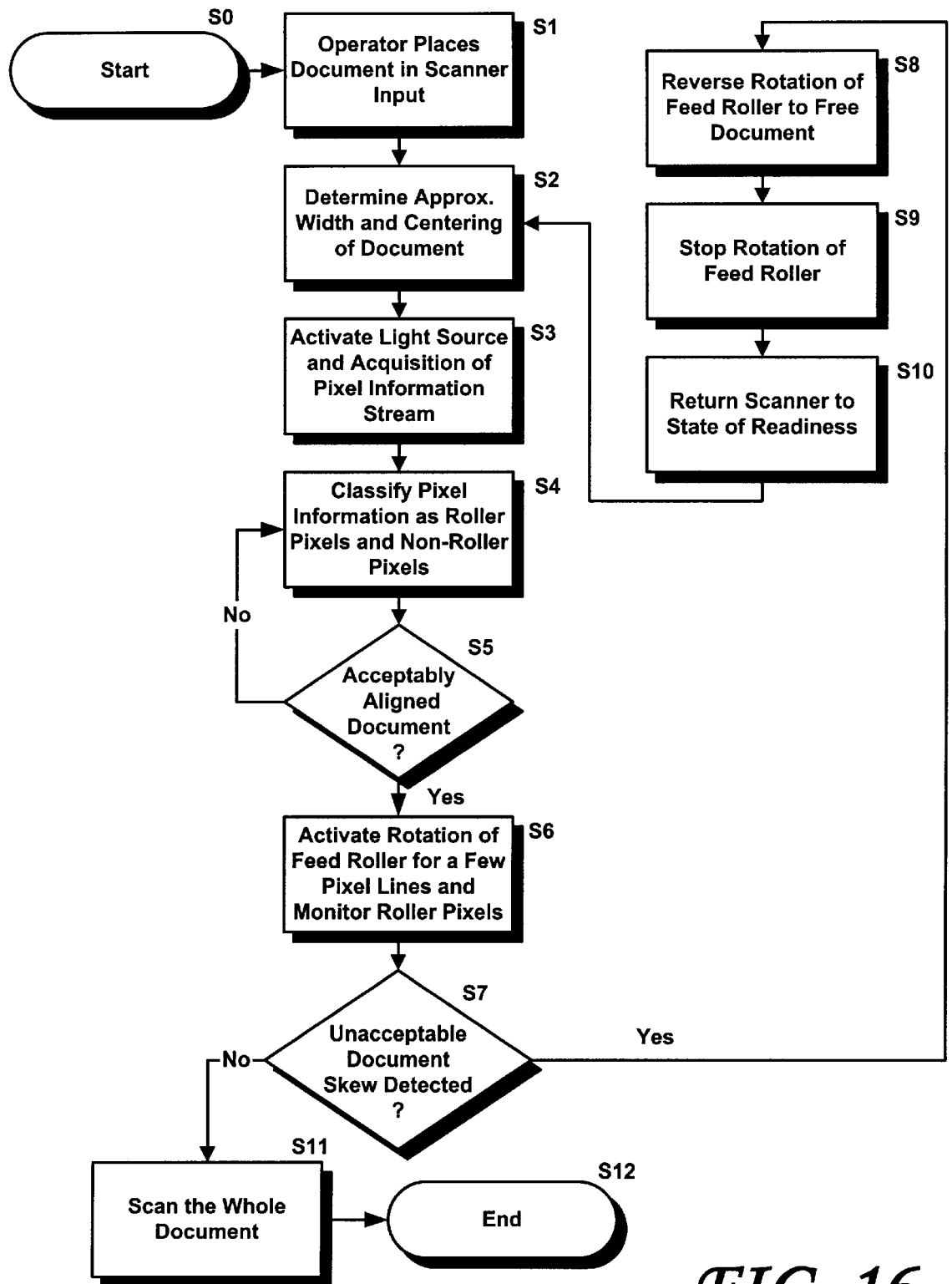
FIG. 16 is a flowchart of an embodiment of the method according to the present invention.

One embodiment of the method according to the present invention is shown in FIG. 16. The method starts at step S0. After the operator places the document in the scanner input at S1, the plurality of paper sensors determine the approximate width and centering of the document, at S2. The light source is then activated and the acquisition of the pixel information stream from the linear image sensor is begun, at S3. The pixels in the information stream are then classified as roller pixels and non-roller pixels, based upon the reflectance of the document and the reflectance of the feed roller, at step S4. When a predetermined number of non-roller pixels are acquired, at step S5, indicating that an acceptably aligned document is present, the rotation of the feed roller of the scanner is activated to seize the document and to pull it across the transparent glass protecting the linear image sensor over a distance of a few pixel lines, as shown at step S6. The roller pixels are also monitored during this feed roller activation step, at S6. If the predetermined number of non-roller pixels has not yet been acquired in step SS, step S4 is repeated. If, at step S7, an unacceptable document skew is detected after the first few pixel lines, the rotation of the feed roller is reversed to free the document, as shown at step S8. The rotation of the feed roller is then stopped at step S9, and the scanner returned to a state of readiness, as shown at step S10. After step S10, the method reverts back to step S2. If, however, unacceptable skew has not been detected, at step S7, the whole document is scanned, according to step S11. The method ends at step S12.

If the edges of the types of documents that are to be scanned are of dark color, the feed roller can be chosen to be a light color or white.

If both the roller and the edge of the document are black or do not present a uniform edge, an overdrive command can be given manually by the operator through the host computer or a special function button placed on the scanner to enable the paper feed. A time-out can also activate the drive roller after the proximity sensors have detected an approaching document if no paper edge is seen by the Anti-Skew Auto-Start system.

To achieve successful Anti-Skew Auto-Start, the positioning accuracy for the sensor line offset must be on the order of several hundredths of a millimeter. To do this, a precision adjustment mechanism, specially designed calibration tools and a corresponding calibration procedure are required. Because sensor offset is very small, there is no possibility of defocusing, which would result in poor image resolution.

The adjustment mechanism to set the offset distance between the sensor and the roller should preferably be chosen to enable continuous adjustment of the offset and parallelism using some form of screw adjustment to displace the sensor or the focusing apparatus.

In order to set the offset and parallelism between the optical sensor line and the roller, two calibration tools are described in the following paragraphs. The first tool is very inexpensive to produce and enables good accuracy. The second tool is rather expensive to manufacture but provides extreme precision and ease of use.

Figure 6:
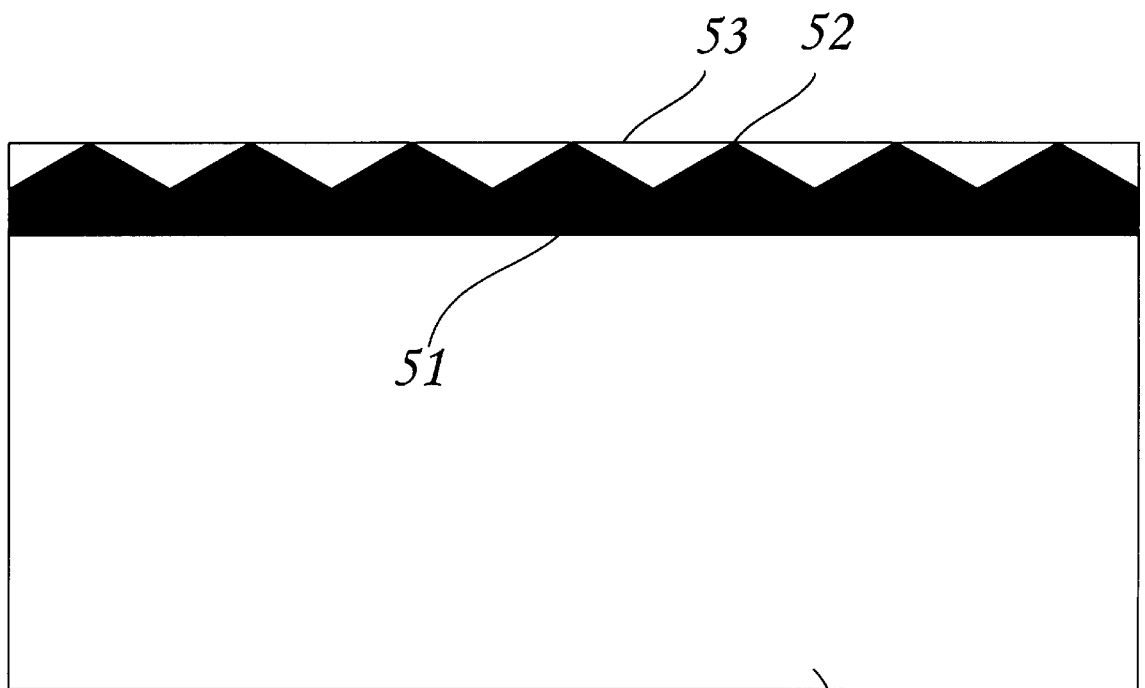
FIG. 6 shows the chevron patterns that are printed on the calibration foil.

The first calibration tool is made of a tough foil such as plastic foil, high-density glossy paper, stainless steel foil or aluminum foil with a thickness of approximately 0.10 to 0.15 mm. Black chevron patterns are printed on the foil that presents a reflective background such as white paper, white paint or polished bare metal surface as shown in FIG. 6. The calibration foil 50 is cut in a rectangular shape with a foil edge 53 corresponding to the scanner input width. The black chevrons 51 are printed thereon such that their peaks 52 align perfectly with the foil edge 53. It is important that the foil edge 53 be a clean and even straight cut. The geometry of the chevrons is to be precise and uniform. Therefore, a photographic process is highly recommended to print the chevrons on the calibration foil.

Figure 7:
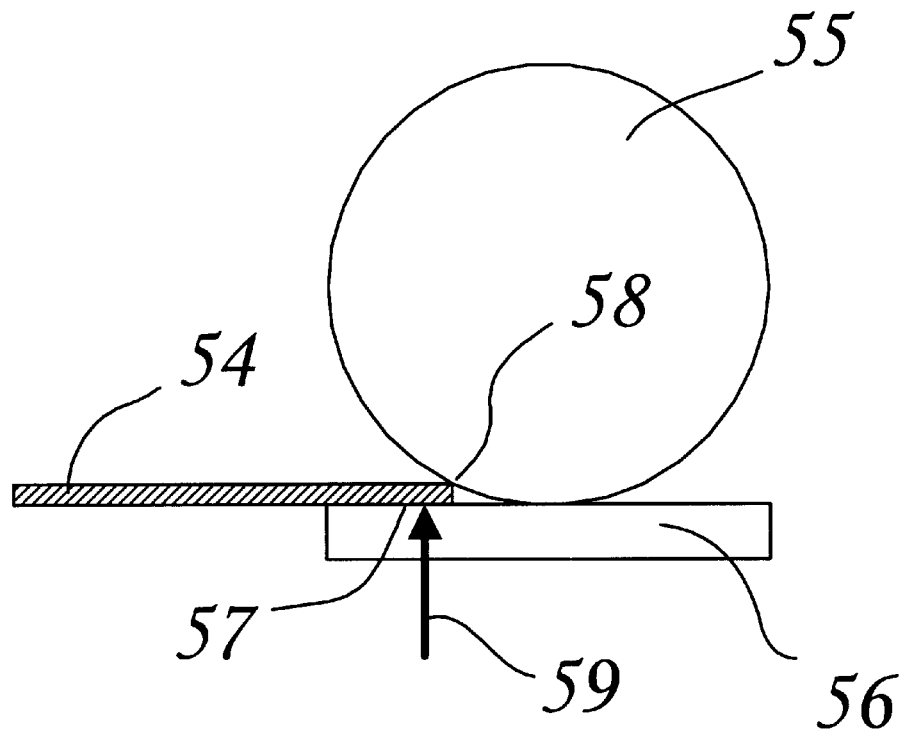
FIG. 7 is a cross-sectional view showing the placement of the calibration foil between the roller and the glass.

While the motor rotation is disabled and the upcoming pixels are monitored by the scanner control electronics or the associated host computer, the calibration foil 54 is pushed s gently and evenly between the roller 55 and the glass 56 as shown in FIG. 7 until the edge 58 arrives at a stop when it hits the roller 55. The chevron patterns should face the surface 57 of the glass. The image sensor optical line 59 registers the reflected light from the chevron patterns placed against the glass surface 57.

Figure 8:
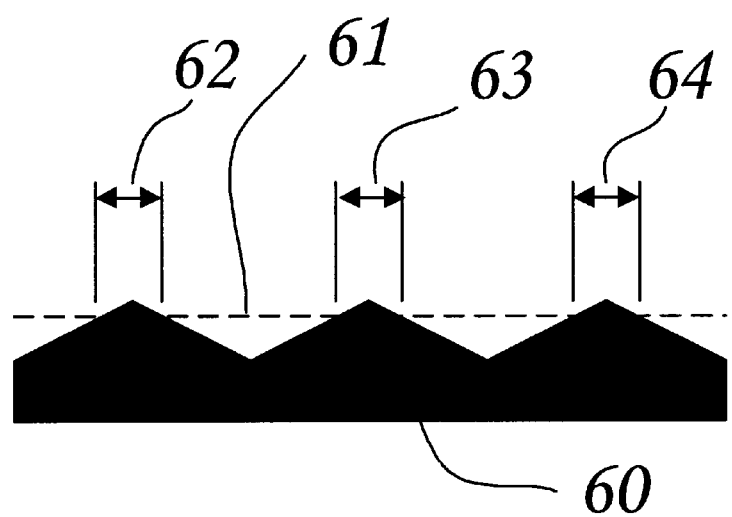
FIG. 8 is a detail view of the alignment of the sensor optical line relative to the calibration foil chevrons.

A detailed top view of the image sensor optical line relative to the chevron pattern is shown in FIG. 8. The focus line 61 cuts through the peaks of the chevron pattern 60. The scanner control electronics or the associated host computer registers the transition between black and white on the optical line 61. A count of black pixels is established for each peak of the chevron pattern that represents the width of the peak 62, 63, 64 seen by the sensor optical line. The greater the count number for a given peak, the greater the offset distance between the roller and the sensor optical line at the peak location.

It is to be noted that the chevron angle affects the sensitivity of the calibration tool. A wider chevron angle provides a greater count difference for a given offset between the sensor optical line and the roller.

Figure 9:
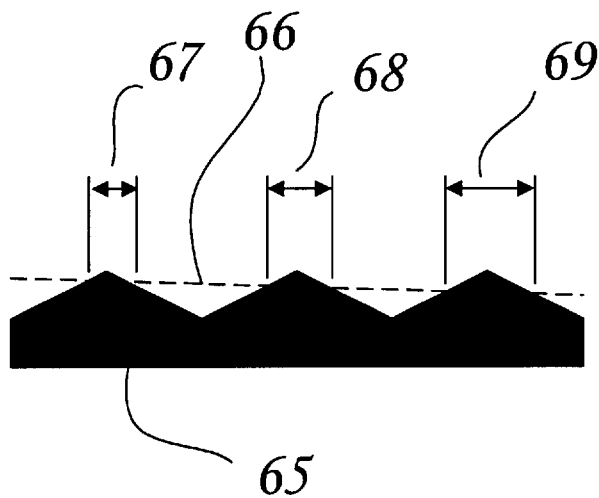
FIG. 9 is a detail view of the alignment of the sensor optical line relative to the calibration foil chevrons when the alignment is not parallel.

Parallelism alignment between the sensor optical line and the roller can be verified by checking the count variation between peaks. FIG. 9 shows a detailed top view of the image sensor optical line relative to the chevron pattern where the offset is non-parallel, meaning exhibiting poor parallelism. The chevron peaks of the chevron pattern 65 and the optical sensor line 66 are not aligned, resulting in a different pixel count for each peak. For example, pixel count for peak 69 is greater that for peak 68 and pixel count for peak 68 is greater than for peak 67.

Once a relative measure of the offset distance and parallelism is obtained, the offset distance can be corrected to an amount that provides the optimum Anti-Skew Auto-start performance. The exact offset amount depends on the roller diameter, its surface hardness, paper griping ability and the thickness of the paper used. Once the optimal offset is determined, all the scanners that are manufactured can be adjusted to the same offset amount using the calibration tool.

The calibration tool described above provides good results but requires careful operation because the pressure, angle and evenness to apply to the calibration foil when ace engaged between the roller and the glass is not always easy to reproduce between operators.

Another embodiment of a calibration tool according to the present invention is described in the following paragraph, which provides greater precision and is not affected by operator skills. The calibration tool makes use of the calibration foil described above but relies on a specially shaped fire to hold the calibration foil accurately in place between the roller and the image sensor glass.

Figure 10:
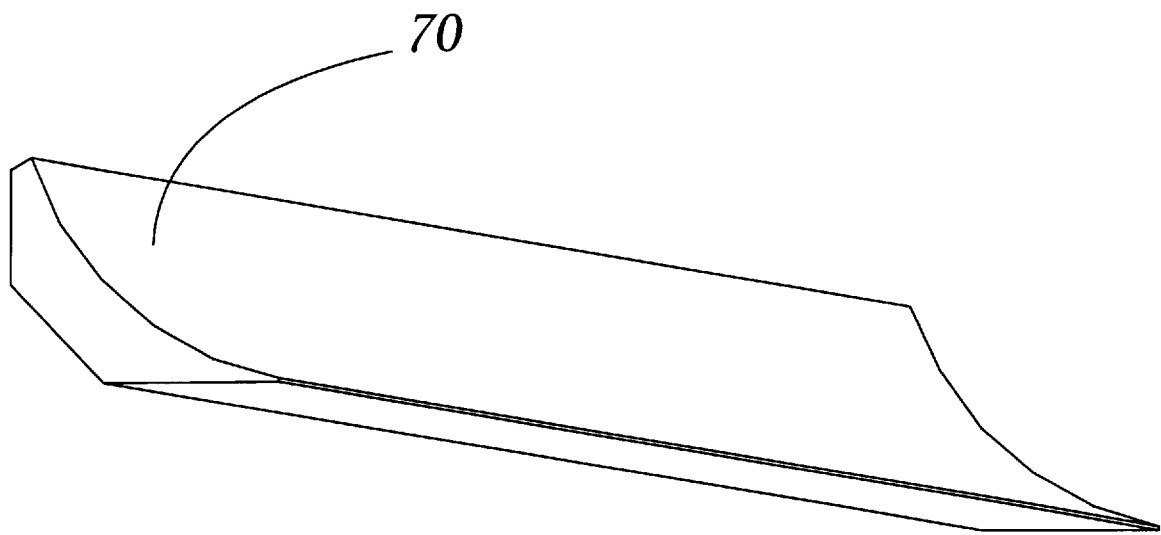
FIG. 10 is a perspective view showing the shape of the calibration ruler.
Figure 11:
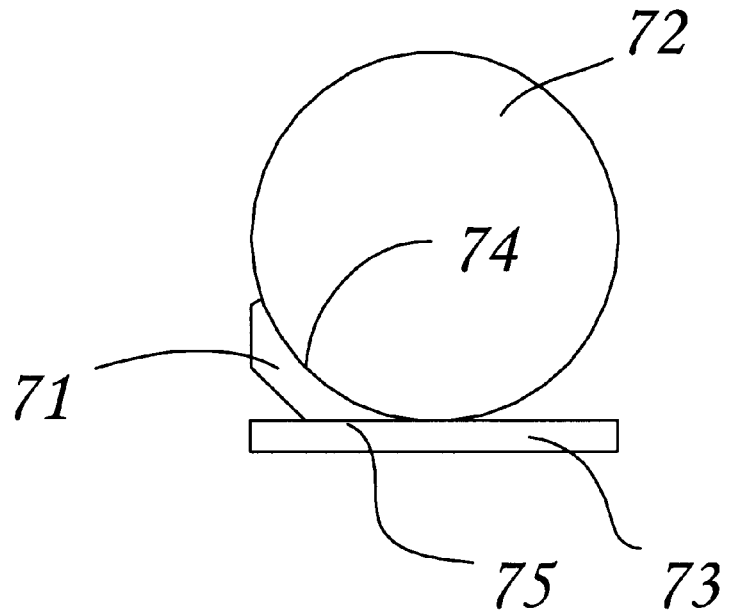
FIG. 11 is a cross-sectional view showing the geometry of the calibration ruler section.

FIG. 10 shows a perspective view of the special calibration ruler 70 that is to be manufactured using precision machining. The cross-sectional geometry of the calibration ruler is shown in FIG. 11. The calibration ruler 71 is an elongated bar that fits in the scanner input between the roller 72 and the glass 73. The geometry of the ruler section is such that one of its faces 74 is machined to have a radius corresponding to the roller radius and another face 75 that is perfectly plane. The calibration ruler 71 fits perfectly between the roller and the glass, and must not bend or twist. The calibration ruler is preferably ground from a bar of tempered steel or machined from a solid bar of glass. The curved face 74 is polished to minimize friction. The calibration tool locks itself perfectly between the roller and the glass when the roller is rotated. It is to be noted that each time the calibration ruler is removed, then replaced in the scanner input, it locks into the same position as soon as the roller is rotated.

Figure 12:
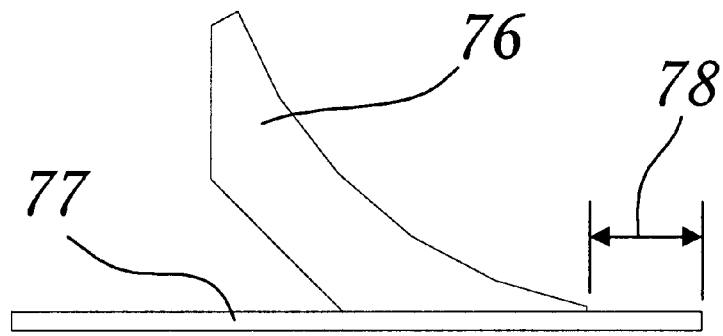
FIG. 12 is a cross sectional showing the relative position of the calibration ruler and the calibration foil.
Figure 13:
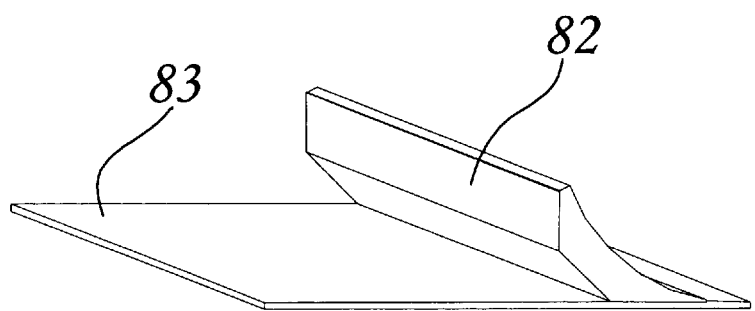
FIG. 13 is a perspective view of the calibration tool.

The calibration ruler 76, 82 is attached by glue, for example, on the calibration foil 77, 83 as shown in FIG. 12 and FIG. 13 making sure there is a sufficient offset 78 such that the foil would engage completely under the roller past the contact point between the roller and the glass when the roller is rotated.

Figure 14:
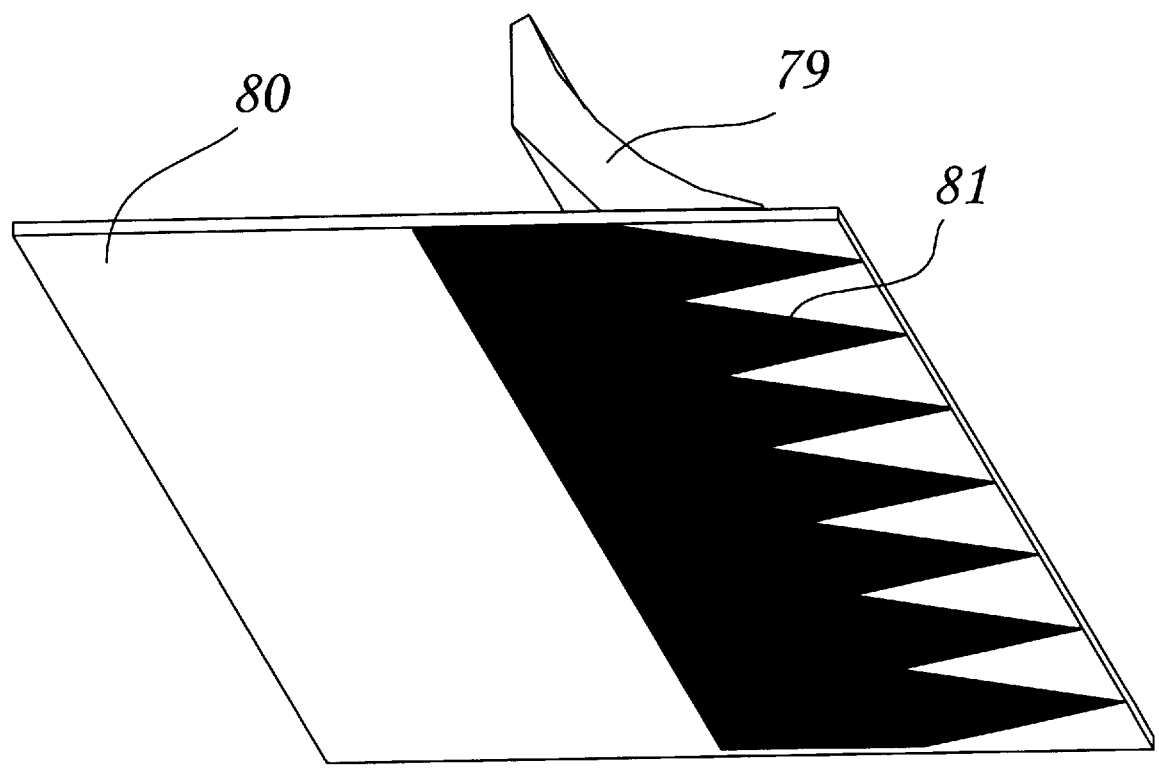
FIG. 14 is a perspective view of the precision calibration tool showing the placement of the calibration chevrons.

The chevrons 81 are located under the foil 80 and ruler 79 assembly in order to face the image sensor as shown in FIG. 14.

Figure 15:
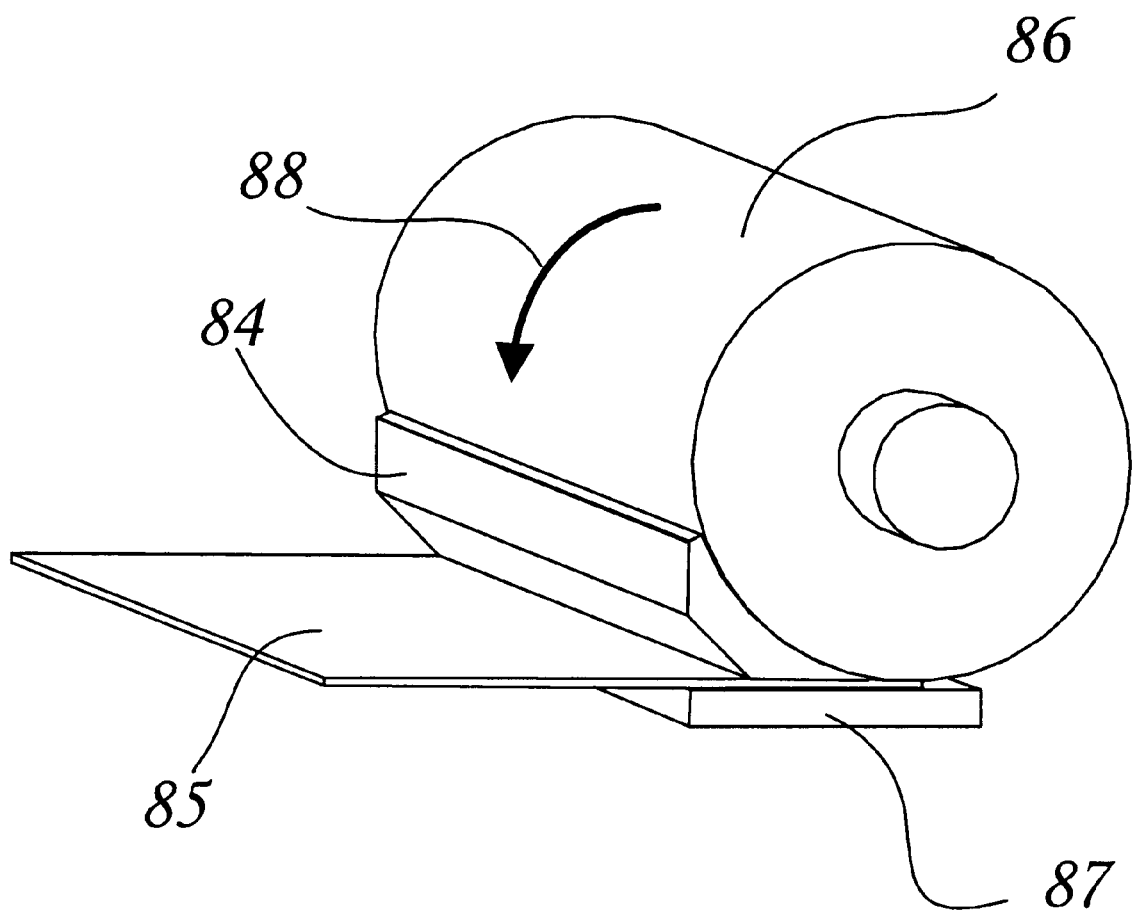
FIG. 15 is a perspective view showing how the calibration bar is placed in the scanner while the roller is rotating.

For greater accuracy and repeatability, the pixel counting that corresponds to the chevron peaks seen by the optical sensor line is performed while the roller 86 is rotating in the direction 88 as shown in FIG. 15, which shows the placement of the calibration tool.

Some variation of the ruler geometry can be created to suit particular scanner input characteristics, sensor characteristics and roller or belt design. It may be necessary to remove the input document guide during the calibration to enable insertion and positioning of the calibration tool.

Suitable calibration software can be created to guide the operator to perform the calibration procedure and provide precise instructions to correct the offset and parallelism, namely, which screw, what direction and how many turns, for example.

The position of the calibration ruler and the calibration foil is not critical. A reference calibration tool and a reference scanner properly adjusted can be used to derive correction coefficients for each calibration tools that is subsequently manufactured.

While the foregoing detailed description has described several embodiments of this invention, it is to be understood that the above description is illustrative only and not limiting of the disclosed invention. For example, the chevrons may have a shape other than that illustrated and described, consistent with their stated functions. Moreover, the elongated bar of the calibration tool may have a different shape than that illustrated without, however, departing from the spirit and scope of the present invention. Indeed, a number of other modifications will no doubt occur to persons of skill in this art. All such modifications, however, should be deemed to fall within the scope of the present invention. Thus, the invention is to be limited only by the claims as set forth below.

What is claimed is:

1. An auto-start and anti-skew system for a sheet-fed scanner including a light source, a feed roller, a linear image sensor and transparent glass disposed over the linear image sensor, the system comprising:

means for detecting an approximate width and a centering of the document placed at an input side of the sheet-fed scanner;

means for activating an illumination of the light source and activating an acquisition of information from the linear image sensor as soon as a document is placed in the input side of the sheet-fed scanner, to provide continuous upcoming pixel information;

means for classifying the continuous upcoming pixel information as roller pixels and non-roller pixels based on a contrast between a reflectance of the feed roller and a reflectance of the document, an acceptably aligned document edge engaged between a non-rotating feed roller and the transparent glass being identified by a predetermined number of non-roller is pixels;

means for maintaining a precise predetermined parallel offset distance between a focus-line of the linear image sensor and an input line of contact where the feed roller contacts the transparent glass; and means for controlling a rotation of the feed roller, the controlling means activating a rotation of the feed roller to seize the document from the input side of the feed roller and pull the document, without inducing an unacceptable skew, over the transparent glass as soon as the approximate width and the centering of the document are detected and the predetermined number of non-roller pixels are acquired.

2. A system according to claim 1, further comprising processing means to determine, from the continuous upcoming pixel information, that an unacceptable skew has been induced soon after the document edge is seized when the rotation of the feed roller is activated, the processing means causing the feed roller rotation control means to reverse a rotation direction of the feed roller to free the document, to stop the rotation of the feed roller, and to return the sheet-fed scanner to a state of readiness to activate the feed roller as soon as an acceptably aligned document is identified.

3. A system according to claim 1, wherein the detecting means comprises a plurality of proximity paper sensors.

4. A system according to claim 3, wherein the plurality of proximity paper sensors are infrared paper sensors.

5. A device for providing, to a sheet-fed scanner including a feed roller and a linear image sensor protected by a transparent glass, a precise offset and alignment information between a focus-line of the linear image sensor and an input line of contact where the feed roller drags against the transparent glass, comprising:

a rigid foil, the rigid foil providing a uniform reflectance that is identifiable on a continuous upcoming pixel information stream generated by the linear image sensor, the rigid foil having a regular pattern of aligned chevrons placed on one side thereof a reflectance of the chevrons being clearly distinguishable within the continuous upcoming pixel information, the regular pattern of aligned chevrons including a plurality of aligned peaks coinciding with an edge of the foil to form a calibration edge to be applied against the input line of a non-rotating feed roller, the regular pattern of aligned chevrons facing the image sensor to allow the peaks to be identified on the continuous upcoming pixel information stream and to provide peak pixels where the focus line intersects with the plurality of peaks;

whereby, geometrical information may be derived from counting a number of the peak pixels for each of the plurality of peaks, the geometrical information giving the precise offset and alignment information between the focus-line of the linear image sensor and the input line of contact where the feed roller drags against the transparent glass protecting the linear image sensor.

6. A device according to claim 5, further comprising:

an elongated bar, the bar being held in place between the feed roller and the transparent glass by frictional forces when the feed roller is rotated, the bar being fixed on the foil adjacent to the calibration edge and on a side of the foil opposite the one side, whereby, the bar holds the calibration edge in place when the feed roller is rotated to provide a precise and repeatable means for obtaining the offset and alignment information.

7. A method of ensuring that an edge of a document to be inserted into a sheet-fed scanner is perfectly aligned, the scanner including a light source, a feed roller, a linear image sensor and transparent glass disposed over the linear image sensor, the method comprising the steps of:

offsetting a focus-line of the linear image sensor relative to an input line of contact where the feed roller drags against the transparent glass;

determining an approximate width and a centering of the document placed at an input side of the scanner;

activating an illumination of the light source and activating an acquisition of information from the linear image sensor to acquire continuous upcoming pixel information;

classifying the continuous upcoming pixel information as roller pixels and non-roller pixels based on a contrast between a reflectance of the feed roller and a reflectance of the document, an acceptably aligned document edge engaged between a non-rotating feed roller and the transparent glass being identified by an acquisition of a predetermined number of non-roller pixels;

controlling a rotation of the feed roller, to activate a rotation of the feed roller and seize the document from the input side of the feed roller and pull the document, without inducing an unacceptable skew, over the transparent glass as soon as the approximate width and centering of the document are detected and the predetermined number of non-roller pixels are acquired.

8. A method according to claim 7, further comprising the steps of:

determining, from the continuous upcoming pixel information, whether an unacceptable skew has been induced on the document soon after the document edge is seized when the rotation of the feed roller is activated, and, if an unacceptable skew has been induced, causing the feed roller to reverse a rotation direction to free the document;

stopping the rotation of the feed roller; and returning the sheet-fed scanner to a state of readiness to activate the feed roller as soon as an acceptably aligned document is identified.

\* \* \* \* \*